United States Patent Office 3,435,034
Patented Mar. 25, 1969

3,435,034
PYRIDAZINO[3,4-b]INDOLES
William J. Houlihan, Mountain Lakes, Robert E. Manning, Parsippany, and William S. Theuer, Chatham, N.J., assignors to Sandoz Inc., Hanover, N.J.
No Drawing. Filed Mar. 17, 1967, Ser. No. 623,800
Int. Cl. C07d 51/04; A61k 27/00
U.S. Cl. 260—250                         7 Claims

ABSTRACT OF THE DISCLOSURE

The compounds are of the class of 3-aryl-9-(ω-aminoalkyl)-pyridazino[3,4-b]indoles, useful as mild tranquilizers and sedatives.

---

This invention relates to tricyclic compounds. In particular, the invention pertains to 3-aryl-9-substituted pyridazino[3,4-b]indoles which may be represented structurally as follows:

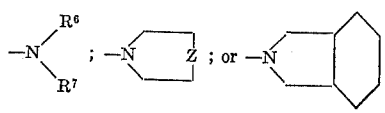

I wherein R represents —$(CH_2)_nR^5$;

each of $R^1$, $R^2$ and $R^3$ is, independently, hydrogen; halo having an atomic weight no greater than 36, i.e., fluoro and chloro; straight chain lower alkyl, preferably having from 1 to 4 carbon atoms, e.g., methyl, ethyl, propyl and butyl; straight chain lower alkoxy, preferably having from 1 to 4 carbon atoms, e.g., methoxy, ethoxy, propoxy and butoxy; or trifluoromethyl; provided that when one of $R^1$, $R^2$ and $R^3$ is trifluoromethyl the others are other than trifluoromethyl;

each $R^4$ is, independently, hydrogen; chloro; or methoxy; $R^5$ represents

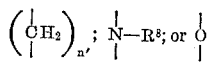

each of $R^6$ and $R^7$ is, independently, hydrogen; or lower alkyl, preferably having from 1 to 4 carbon atoms, e.g., methyl, ethyl, propyl and butyl;
Z represents

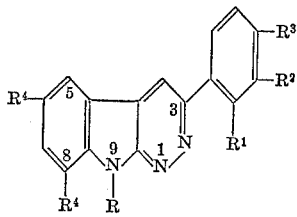

$R^8$ represents lower alkyl, preferably containing from 1 to 4 carbon atoms, e.g., methyl, ethyl, propyl and butyl;
n represents 2 or 3; and
n' represents a whole number of from 0 to 2, inclusive, i.e., 0, 1 or 2.

The above compounds are prepared by reacting 3-phenyl-9H-pyridazino[3,4-b]indole or an appropriately substituted derivative thereof with an alkali-metal hydride or amide to form the corresponding 1-alkali-metal salt and reacting the latter with an appropriate amino-alkyl halide (or arylsulfonate). This process is illustrated by the following reaction scheme:

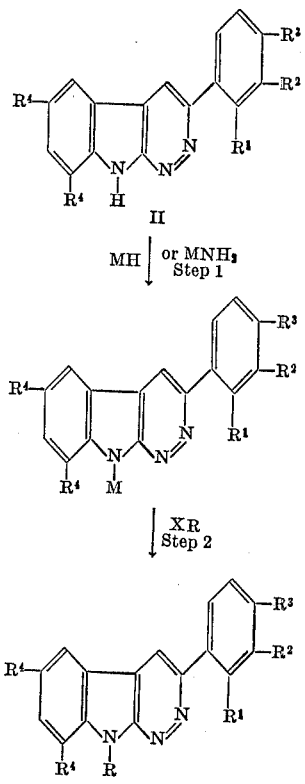

wherein R, $R^1$, $R^2$, $R^3$ and $R^4$ are as defined above, M represents alkali-metal, preferably sodium or lithium, and X represents chloro, bromo or an arylsulfonyloxy, e.g. benzenesulfonyloxy and p-tolylsulfonyloxy.

The preparation of the alkali-metal salt (Step 1) is conveniently carried out in an inert organic solvent, e.g. dimethylformamide, dimethylacetamide, toluene and tetrahydrofuran, and at a temperature of from about 0° C. to about 65° C. The conversion of the thus obtained salt (which can be isolated by conventional methods if desired) to the desired product (Step 2) is readily effected in an inert organic solvent and at a temperature of from about 0° C. to about 50° C. Suitable solvents are those exemplified for Step 1 of the process. It is generally preferred to carry out the reaction in the same medium employed for the preparation of the alkali-metal salt precursor.

Many of the starting materials (II) employed in the above process are known and can be prepared as described in the literature [see, e.g., G. Kobayaski and S. Furukawa, Chem. Pharm. Bull., 12, 1129–1135 (1964)]. Such others which may not be specifically disclosed in the literature can be prepared from available materials in analogous manner.

The compounds of Formula I are useful because they possess pharmacological activity in animals. In particular, the compounds are useful as mild tranquilizers and sedatives. For such uses the compounds may be admixed with conventional pharmaceutical carriers, and other adjuvants, if necessary, and administered either orally in the form of capsules, tablets, elixirs, suspensions or solutions, or parenterally in the form of an injectable solution or emulsion. Furthermore, the compounds may be similarly administered in the form of their non-toxic pharmaceutically acceptable acid addition salts. Such salts do not materially differ from the free base in their pharmacological effects and are included within the scope of the invention. Representative of such salts are the mineral salts such as the hydrochloride, hydrobromide, sulfate, phosphate and the like and the organic acid salts such as the benzoate, acetate, maleate, p-toluenesulfonate, benzenesulfonate and the like. Such salts are readily prepared by reacting the base with a pharmacologically acceptable acid in conventional manner.

For the above-mentioned uses, the dosage administered will, of course, vary depending upon the compound employed, the treatment desired and the mode of administration. However, in general, satisfactory results are obtained when the daily dose of the compound administered is in the range from about 1 milligram to about 20 milligrams per kilogram of animal body weight, preferably given in divided doses, 2 to 4 times a day, or in sustained release form. For the larger mammals the daily dosage is desirably in the range of from about 50 milligrams to about 250 milligrams, preferably given in divided doses of from about 12.5 milligrams to about 125 milligrams, 2 to 4 times a day. A representative formulation suitable for oral administration is a tablet (prepared by standard tabletting techniques) and containing, by weight, 50 parts of 3-(p-chlorophenyl) - 9 - (2-dimethylaminoethyl)-pyridazino[3,4-b]indole dihydrochloride, 2 parts of tragacanth, 39.5 parts of lactose, 5 parts of corn starch, 3 parts of talcum and 0.5 parts of magnesium stearate.

The following examples show representative compounds contemplated by the present invention and the manner in which said compounds are prepared. However, it is to be understood that the examples are intended for the purpose of illustration only and are not intended as in any way limiting the scope of the invention which is defined in the appended claims.

EXAMPLE 1

3-(p-chlorophenyl)-9-(2-dimethylaminoethyl)-pyridazino[3,4-b]indole

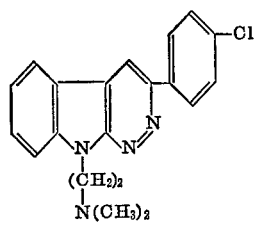

Step A.—Preparation of 3-(p-chlorophenacyl)-3-hydroxyoxindole

A 12 l. flask equipped with a stirrer is charged with 316 g. (2.0 moles) of p-chloroacetophenone, 300 g. (2.0 moles) of isatin, 6 l. of ethanol and 33 ml. of diethylamine. The mixture is stirred overnight at room temperature (20–25° C.) and the resulting crystals filtered off and washed with 500 ml. of methanol to obtain 3-(p-chlorophenacyl)-3-hydroxyoxindole, M.P. 195–196° C.

Step B.—Preparation of 3-(p-chlorophenacylidene)-oxindole

A 5 l. flask equipped with a stirrer is charged with 265 g. (0.88 mole) of 3-(p-chlorophenacyl)-3-hydroxyoxindole, 800 ml. of absolute ethanol and 1600 ml. of concentrated hydrochloric acid, the mixture is refluxed for 30 minutes, then cooled to room temperature and stirred overnight. The resulting solid material is filtered off and washed with 200 ml. of ethanol to obtain 3-(p-chlorophenacylidene)-oxindole, M.P. 195–196° C.

Step C.—Preparation of 3-(p-chlorophenacyl)-oxindole

A 5 l. flask equipped with a stirrer is charged with 98 g. (0.35 mole) of 3-(p-chlorophenacylidene)-oxindole in 1.5 l. of 95% ethanol, and 98 g. (0.56 mole) of sodium dithionite in 500 ml. of water. The mixture is stirred overnight at room temperature and the crystalline material than filtered off and washed successively with 100 ml. of warm water, 50 ml. of ethanol and 100 ml. of diethyl ether to obtain 3-(p-chlorophenacyl)-oxindole, M.P. 184–185° C.

Step D.—Preparation of 3-(p-chlorophenyl)-9H-pyridazino[3,4-b]indole

A 2 l. flask equipped with a stirrer is charged with 84 g. (0.30 mole) of 3-(p-chlorophenacyl)-oxindole, 500 ml. of glacial acetic acid and 30.2 g. (0.75 mole) of 80% aqueous solution of hydrazine hydrate. The mixture is refluxed for 3 hours, then cooled to room temperature and stirred overnight. Water is then added (approximately 500 ml.) and the precipitate which forms is filtered off to obtain 3-(p-chlorophenyl)-9H-pyridazino[3,4-b]indole, M.P. 303–304° C.

Step E.—Preparation of 3-(p-chlorophenyl)-9-(2-dimethylaminoethyl)-pyridazino[3,4-b]indole A 2 l. flask equipped with a stirrer, thermometer, dropping funnel, condenser and inlet tube is blanketed with nitrogen and then charged with 25 g. (0.089 mole) of 3-(p-chlorophenyl)-9H-pyridazino[3,4-b]indole, 500 ml. of absolute dimethylformamide and 4.8 g. of a 50% suspension of sodium hydride in mineral oil. The mixture is stirred for 1½ hours at 45° C., then cooled to room temperature (20–25° C.) and treated with 10.2 g. (0.098 mole) of 2-dimethylaminoethyl chloride in 50 ml. of dimethylformamide. The resulting mixture is stirred for 3 hours at 55° C., then 48 hours at room temperature and then filtered and the filtrate evaporated. The resulting oil is treated with 100 ml. of an aqueous saturated solution of sodium chloride, then extracted with 250 ml. of chloroform and the chloroform layer dried over anhydrous sodium sulfate. The dried chloroform layer is then treated with dry hydrogen chloride gas and the dihydrochloride salt of 3-(p-chlorophenyl) - 9 - (2 - dimethylaminoethyl)-pyridazino[3,4-b]indole, M.P. 270–272° C. precipitated by the addition of 250 ml. diethyl ether. Recrystallization from methanol-diethyl ether (1:1) affords material melting at 270–272° C.

EXAMPLE 2

3-(p-chlorophenyl)-9-(3-dimethylaminopropyl)-pyridazino[3,4-b]indole

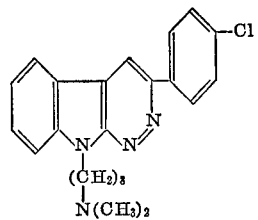

A 2 l. flask equipped with a stirrer, thermometer, dropping funnel, condenser and inlet tube is blanketed with nitrogen and then charged with 25 g. (0.089 mole) of 3-(p-chlorophenyl)-9H-pyridazino[3,4-b]indole, 500 ml. of absolute dimethylformamide and 4.8 g. of a 50% suspension of sodium hydride in mineral oil. The mixture is stirred for 1½ hours at 45° C., then cooled to room temperature and treated with 15.5 g. (0.098 mole) of 3-dimethylaminopropyl chloride in 50 ml. of dimethylformamide. The resulting mixture is stirred for 4 hours at 55° C., then 24 hours at room temperature and then filtered and the filtrate evaporated. The resulting oil is taken up in 250 ml. of chloroform. The chloroform solution is treated with dry hydrogen chloride gas and the resulting precipitate filtered off to obtain 3-(p-chlorophenyl) - 9-(3-dimethylaminopropyl - pyridazino[3,4 - b] indole dihydrochloride, M.P. 225–275° C. (dec.). Recrystallization from methanol-diethylether (1:1) affords product, M.P. 280–282° C. (dec.).

EXAMPLE 3

3-phenyl-9-(2-dimethylaminoethyl)-
pyridazino[3,4-b]indole

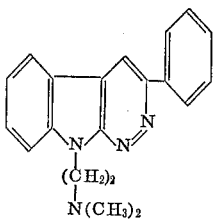

A 2 l. flask equipped with a stirrer, thermometer, dropping funnel, condenser and inlet tube is blanketed with nitrogen and then charged with 15.0 g. (0.06 mole) of 3-phenyl-9H-pyridazino[3,4-b]indole, 300 ml. of absolute dimethylformamide and 2.7 g. of a 50% suspension of sodium hydride in mineral oil. The mixture is stirred for 1½ hours at 45° C., then cooled to room temperature and treated with 7.3 g. (0.07 mole) of 2-dimethylaminoethyl chloride in 50 ml. of dimethylformamide. The resulting mixture is stirred for 4 hours at 55° C., then 24 hours at room temperature and then filtered and the filtrate evaporated. The resulting oil is taken up in 250 ml. of chloroform. The chloroform solution is treated with dry hydrogen chloride gas and the resulting precipitate filtered off to obtain 3-phenyl-9-(2-dimethylaminoethyl)-pyridazino[3,4-b]indole hydrochloride, M.P. 246–248° C. (dec.) after recrystallization from ethanol-diethyl ether (1:1).

EXAMPLE 4

3-(p-methoxyphenyl)-9-(2-dimethylaminoethyl)-
pyridazino[3,4-b]indole

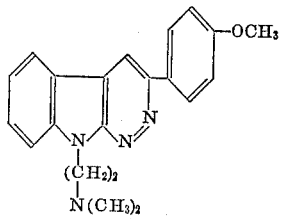

A 2 l. flask equipped with a stirrer, thermometer, dropping funnel, condenser and inlet tube is blanketed with nitrogen and then charged with 24.6 g. (0.09 mole) of 3-(p-methoxyphenyl)9H-pyridazino[3,4-b]indole, 500 ml. of absolute dimethylformamide and 4.0 g. of a 50% suspension of sodium hydride in mineral oil. The mixture is stirred for 1½ hours at 45° C., then cooled to room temperature and treated with 14.2 g. (0.1 mole) of 2-dimethylaminoethyl chloride in 50 ml. of dimethylformamide. The resulting mixture is stirred for 4 hours at 55° C., then 24 hours at room temperature and then filtered and the filtrate evaporated. The resulting oil is taken up in 250 ml. of chloroform. The chloroform solution is treated with dry hydrogen chloride gas and the resulting precipitate filtered off to obtain 3-(p-methoxyphenyl)-9-(2-dimethylaminoethyl)-pyridazino[3,4-b]indole hydrochloride, M.P. 283–285° C. (dec.) after recrystallization from ethanol-diethyl ether (1:1).

EXAMPLE 5

3-(p-chlorophenyl)-6,8-dichloro-9-(3-dimethylamino-
propyl)-pyridazino[3,4-b]indole

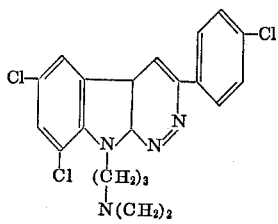

A 2 l. flask equipped with a stirrer, thermometer, dropping funnel, condenser and inlet tube is blanketed with nitrogen and then charged with 13 g. (0.037 mole) of 3-(p-chlorophenyl)-6,8-dichloro - 9H - pyridazino[3,4-b]indole, 260 ml. of absolute dimethylformamide and 1.7 g. of a 50% suspension of sodium hydride in mineral oil. The mixture is stirred for 1½ hours at 45° C., then cooled to room temperature and treated with 4.9 g. (0.041 mole) of 3-dimethylaminopropyl chloride in 50 ml. of dimethylformamide. The resulting mixture is stirred for 4 hours at 55° C., then 24 hours at room temperature and then filtered and the filtrate evaporated. The resulting oil is taken up in 250 ml. of chloroform. The chloroform solution is treated with dry hydrogen chloride gas and the resulting precipitate filtered off to obtain 3-(p-chlorophenyl)-6,8-dichloro - 9 - (3-dimethylaminopropyl-pyridazino[3,4-b]indole hydrochloride, M.P. 274–276° C. (dec.) after recrystallization from ethanol-diethyl ether (1:1).

EXAMPLE 6

3-(p-chlorophenyl)-6,8-dichloro-9-(2-dimethylamino-
ethyl)-pyridazino[3,4-b]indole

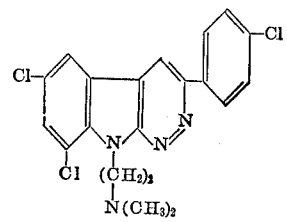

A 2 l. flask equipped with a stirrer, thermometer, dropping funnel, condenser and inlet tube is blanketed with nitrogen and then charged with 13 g. (0.037 mole) of 3-(p-chlorophenyl)-6,8-dichloro-9H-pyridazino[3,4-b]indole, 260 ml. of absolute dimethylformamide and 1.7 g. of a 50% suspension of sodium hydride in mineral oil. The mixture is stirred for 1½ hours at 45° C., then cooled to room temperature and treated with 4.5 g. (0.041 mole) of 2-dimethylaminoethyl chloride in 50 ml. of dimethylformamide. The resulting mixture is stirred for 4 hours at 55° C., then 24 hours at room temperature and then filtered and the filtrate evaporated. The resulting oil is taken up in 250 ml. of chloroform. The chloroform solution is treated with dry hydrogen chloride gas and the resulting precipitate filtered off to obtain 3-(p-chlorophenyl)-6,8-dichloro - 9 - (2-dimethylaminoethyl)-pyridazino[3,4-b]indole hydrochloride, M.P. 290–292° C. (dec.) after recrystallization from methanol-diethyl ether (1:1).

What is claimed is:

1. A compound selected from the group consisting of indoles of the formula

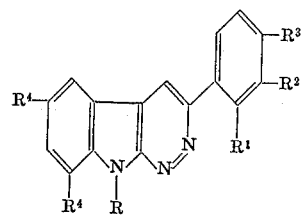

and the pharmaceutically acceptable acid addition salts thereof, wherein R represents —$(CH_2)_nR^5$;

each of $R^1$, $R^2$ and $R^3$ is, independently, hydrogen, halo having an atomic weight no greater than 36, straight chain lower alkyl, straight chain lower alkoxy or trifluoromethyl; provided that when one of $R^1$, $R^2$ and $R^3$ is trifluoromethyl the others are other than trifluoromethyl;

each R⁴ is, independently, hydrogen, chloro or methoxy;
R⁵ represents

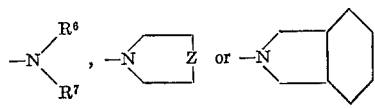

each of R⁶ and R⁷ is, independently, hydrogen or lower alkyl;
Z represents

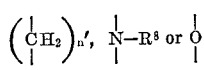

R⁸ represents lower alkyl;
n represents 2 or 3; and
n' represents a whole number of from 0 to 2, inclusive.

2. The compound of claim 1 which is 3-(p-chlorophenyl) - 9 - (2 - dimethylaminoethyl)-pyridazino[3,4-b]indole.

3. The compound of claim 1 which is 3-(p-chlorophenyl)-9 - (3 - dimethylaminopropyl)-pyridazino[3,4-b]indole.

4. The compound of claim 1 which is 3-phenyl-9-(2-dimethylaminoethyl)-pyridazins[2,3-b]indole.

5. The compound of claim 1 which is 3-(p-methoxyphenyl) - 9 - (2 - dimethylaminoethyl)-pyridazino[3,4-b]indole.

6. The compound of claim 1 which is 3-(p-chlorophenyl) - 6,8 - dichloro - 9 - (3 - dimethylaminopropyl)-pyridazino[3,4-b]indole.

7. The compound of claim 1 which is 3-(p-chlorophenyl) - 6,8 - dichloro - 9 - (2-dimethylaminoethyl)-pyridazino[3,4-b]indole.

References Cited

Chemical Abstracts, vol. 62, pp. 539–540 (1965).

NICHOLAS S. RIZZO, *Primary Examiner.*

U.S. Cl. X.R.

424—250